(12) United States Patent  (10) Patent No.: US 7,847,910 B2
Miyakawa et al.  (45) Date of Patent: Dec. 7, 2010

(54) DISPLAY PANEL AND METHOD OF MANUFACTURING THE SAME

(75) Inventors: Osamu Miyakawa, Kumamoto (JP); Toshio Araki, Kumamoto (JP)

(73) Assignee: Mitsubishi Electric Corporation, Tokyo (JP)

(*) Notice: Subject to any disclaimer, the term of this patent is extended or adjusted under 35 U.S.C. 154(b) by 163 days.

(21) Appl. No.: 12/170,093

(22) Filed: Jul. 9, 2008

(65) Prior Publication Data

US 2009/0016001 A1 Jan. 15, 2009

(30) Foreign Application Priority Data

Jul. 10, 2007 (JP) .............................. 2007-181257

(51) Int. Cl.
*G02F 1/1345* (2006.01)
(52) U.S. Cl. .................................... 349/151
(58) Field of Classification Search ................ None
See application file for complete search history.

(56) References Cited

U.S. PATENT DOCUMENTS

| | | | |
|---|---|---|---|
| 5,995,174 A | 11/1999 | Ukita | |
| 6,734,925 B1* | 5/2004 | Lee et al. | 349/40 |
| 7,110,057 B2* | 9/2006 | Jeon | 349/40 |
| 7,538,848 B2* | 5/2009 | Park et al. | 349/152 |
| 2001/0030717 A1 | 10/2001 | Kaneko et al. | |
| 2005/0030465 A1* | 2/2005 | Park et al. | 349/149 |
| 2006/0102907 A1 | 5/2006 | Lee et al. | |
| 2009/0161057 A1* | 6/2009 | Kim et al. | 349/149 |

FOREIGN PATENT DOCUMENTS

| | | |
|---|---|---|
| JP | 6-222386 | 8/1994 |
| JP | 7-120789 | 5/1995 |
| JP | 10-10576 | 1/1998 |
| JP | 11-281992 | 10/1999 |
| JP | 2001-194676 | 7/2001 |
| JP | 2004-205550 | 7/2004 |
| JP | 2006-148040 | 6/2006 |

* cited by examiner

*Primary Examiner*—Sung H Pak
(74) *Attorney, Agent, or Firm*—Oblon, Spivak, McClelland, Maier & Neustadt, L.L.P.

(57) ABSTRACT

A display panel according to the present invention includes: a common wiring (4) formed above a TFT array substrate (30) and having a first terminal (5); a first transparent conductive film (6) formed above the common wiring (4); an interlayer insulating film (15) formed above the first transparent conductive film (6) and having a first terminal portion contact hole (17) formed outside a display area (54) and inside a sealing material (50); and a terminal pad (20) formed above the interlayer insulating film (15) and electrically connected to the common wiring (4) through the first transparent conductive film (6) in the first terminal portion contact hole (17).

16 Claims, 10 Drawing Sheets

RELATED ART

RELATED ART

RELATED ART

DISPLAY PANEL AND METHOD OF MANUFACTURING THE SAME

BACKGROUND OF THE INVENTION

1. Field of the Invention

The present invention relates to a display panel and a method of manufacturing the same. For example, the present invention relates to a display panel having contact holes and a method of manufacturing the same.

2. Description of Related Art

Examples of display panels include a simple matrix panel and an active matrix panel having thin film transistors (TFTs) serving as switching elements. In recent years, an active matrix display device using TFTs has been widely put to practical use, because of its visual quality. Examples of such a display panel include a liquid crystal display panel and an electro-luminescence (EL) display panel. The liquid crystal display panel serving as an electro-optic element using a liquid crystal has been vigorously applied to a display device. The liquid crystal display panel with characteristics of being thin and low power consumption is widely used for office automation equipment such as a personal computer, a cellular phone, a portable information device such as a personal digital assistance, a car navigation system with a liquid crystal display monitor, a camera-integrated VTR, or a television. In recent years, there has been also employed an electro-luminescence (EL) display panel characterized by having a high level of visibility, a high-speed response, a high view angle, a thin shape, a light weight, and the like provided through light-emitting display.

A liquid crystal display panel mounted on a liquid crystal display device itself does not emit light, unlike a display using a conventional cathode-ray tube or an electro-luminescence (EL) device. For this reason, there is often employed a transmissive liquid crystal display panel having a illuminating device which includes a fluorescent tube called a backlight and which is installed on a rear surface or on a side surface of the liquid crystal display panel. In the transmissive liquid crystal display panel, light is illuminated by the backlight and an amount of transmission of light is controlled, to thereby display an image. The transmissive liquid crystal display panel has a high level of visibility in a dark place, but has a low level of visibility in a bright place.

For this reason, for a personal digital assistance and the like, which are often used to be carried outdoors on a daily basis, there is used a reflective liquid crystal display panel utilizing surrounding light instead of the backlight as a light source. The reflective liquid crystal display panel includes a reflective film, instead of a transparent film, used for a pixel electrode portion of a substrate. The surrounding light is reflected on a surface of the reflective film, whereby an image is displayed. Thus, the reflective liquid crystal display panel requires no backlight, which is advantageous in that a power consumption can be reduced. However, the reflective liquid crystal display panel also has a disadvantage in that the visibility is extremely lowered when the surrounding light is not sufficient.

In order to solve the above-mentioned problems, there is employed a transflective liquid crystal display panel which allows a part of light from the backlight to be transmitted and which allows a part of surrounding light to be reflected (see FIGS. 1 to 4 of Japanese Unexamined Patent Application Publication No. 11-281992). The transflective liquid crystal display panel includes a transmission portion having a transparent film used for a pixel electrode portion, and a reflection portion having a reflective film used for a pixel electrode portion. Thus, transmissive display as well as reflective display can be realized using a single liquid crystal display panel.

As described above, there are conventionally employed three main types of liquid crystal display panels, that is, transmissive, reflective, and transflective liquid crystal display panels. In this case, the typical configurations of those liquid crystal display panels are shown in FIGS. 8 to 13. First, referring to FIGS. 8 and 9, a description is given of the configuration of the transmissive liquid crystal display panel. FIG. 8 is a plan view showing the configuration of each of a TFT and a pixel electrode portion of the transmissive liquid crystal display panel. FIG. 9 is a cross-sectional view showing the configuration of each of the TFT and the pixel electrode portion of the transmissive liquid crystal display panel. Note that FIG. 9 also shows the configuration of the cross section of each of a gate terminal portion and a source terminal portion. Those components each serve as a connection portion to be connected with a drive circuit so as to transmit a scan signal and a video signal (display signal) from the drive circuit.

The transmissive liquid crystal display panel includes a TFT 100 provided for each pixel. By use of a transmissive electrode 101 as a pixel electrode, the transmissive electrode 101 is formed on substantially the entire surface of each pixel. In general, as the transmissive electrode 101, there is used a transparent conductive film such as ITO made of indium oxide or tin oxide. On a gate terminal 102 and a source terminal 103, each of which serves as a connection portion to be connected with the drive circuit, a gate terminal pad 104 and a source terminal pad 105 are formed, respectively. The TFT 100 and the transmissive electrode 101, the gate terminal 102 and the gate terminal pad 104, and the source terminal 103 and the source terminal pad 105 are connected to each other via contact holes 106.

Next, referring to FIGS. 10 and 11, a description is given of the configuration of the transflective liquid crystal display panel. FIG. 10 is a plan view showing the configuration of each of a TFT and a pixel electrode portion of the transflective liquid crystal display panel. FIG. 11 is a cross-sectional view showing the configuration of each of the TFT and the pixel electrode portion of the transflective liquid crystal display panel. Note that FIG. 11 also shows the configuration of the cross section of each of a gate terminal portion and a source terminal portion.

As in the case of the transmissive liquid crystal display panel, the transflective liquid crystal display panel includes the TFT 100, the transmissive electrode 101, the gate terminal 102, the source terminal 103, the gate terminal pad 104, and the source terminal pad 105. In a similar manner as in the transmissive liquid crystal display panel, those components are connected to each other via the contact holes 106. The transflective liquid crystal display panel has a reflective electrode 107 formed in an area corresponding to substantially a half of a pixel on a side of the TFT 100. Thus, as the pixel electrodes, the transmissive electrode 101 and the reflective electrode 107 are used. As the reflective electrode 107, Ag or Al is used in many cases.

Next, referring to FIGS. 12 and 13, a description is given of the configuration of the reflective liquid crystal display panel. FIG. 12 is a plan view showing the configuration of each of a TFT and a pixel electrode portion of the reflective liquid crystal display panel. FIG. 13 is a cross-sectional view showing the configuration of each of the TFT and the pixel electrode portion of the reflective liquid crystal display panel.

Note that FIG. 13 also shows the configuration of the cross section of each of a gate terminal portion and a source terminal portion.

As in the case of the transmissive liquid crystal display panel, the reflective liquid crystal display panel includes the TFT 100, the gate terminal 102, the source terminal 103, the gate terminal pad 104, and the source terminal pad 105. The reflective electrode 107 is used as the pixel electrode, and the reflective electrode 107 is formed on substantially the entire surface of each pixel. As the reflective electrode 107, Ag or Al is used in many cases. In a similar manner as in the transmissive liquid crystal display panel, those components are connected to each other via the contact holes 106.

In any type of the liquid crystal display panels, on the gate terminal 102 and the source terminal 103, each of which serves as the connection portion to be connected with the drive circuit, the gate terminal pad 104 and the source terminal pad 105 are formed. As the gate terminal pad 104 and the source terminal pad 105, a transparent conductive film such as ITO is generally used so as to prevent high resistance due to oxidation of the connection portion caused in a post process, operating environments, and the like. In the transmissive or transflective liquid crystal display panel, the transmissive electrode 101 made of ITO or the like is formed. An ITO film made of indium oxide series or tin oxide series and thus used as the gate terminal pad 104, the source terminal pad 105, or the transmissive electrode 101 has a low coverage characteristic (see Japanese Unexamined Patent Application Publication No. 11-281992). For this reason, as shown in FIGS. 9, 11, and 13, in the contact hole 106 serving as the connection portion between the transmissive electrode 101 and the TFT, or in the contact hole 106 serving as the connection portion between the terminal and the pad, a coverage defect portion 108 of the ITO film is generated due to steps formed at the contact holes. In other words, a disconnection of the transmissive electrode 101, the gate terminal pad 104, and the source terminal pad 105 is likely to occur. As a result, a display defect or display unevenness of the liquid crystal display panel occurs.

Further, in recent years, to reduce a frame size of a liquid crystal display panel, a drive circuit is incorporated into a peripheral portion of the liquid crystal display panel. As a result, contact holes are formed in a peripheral portion of the liquid crystal display panel, in particular, in the vicinity of a sealing material which is formed so as to surround the circumference of the liquid crystal display panel. The contact holes formed in the vicinity of the sealing material also have the ITO film formed in an upper layer of the wirings, electrodes, or terminals that are made of metal or the like. In this case, since the ITO film has a low coverage characteristic, the wirings, electrodes, or terminals formed below the ITO film are affected by water or impurities entering from the sealing material. As a result, the wirings, electrodes, or terminals are corroded or electrically corroded.

In particular, as a result of studies made by the inventors of the present invention, it has been found that the coverage defect of the ITO film highly frequently occurs in a case of employing a process in which the ITO film is formed in an amorphous state and is then crystallized. In general, in a process for patterning the ITO film, wet etching using liquid chemical is often used. In a case of a crystalline ITO film, it is necessary to use strong acid containing aqueous solution with hydrochloric acid and nitride acid, as the liquid chemical to be used for the wet etching. In this case, when metal thin films made of Al, Ag, or Mo coexist as the gate signal lines, the source signal lines, or the reflective electrodes, there is a fear that those metal thin films are corroded and disconnected during a wet etching process for the ITO film.

On the other hand, an amorphous ITO film can be subjected to wet etching using weak acid such as oxalic acid series aqueous solution. For this reason, even when metal thin films made of Al, Ag, or Mo coexist, there is no fear that those metal thin films are corroded and disconnected. Accordingly, the ITO film is first formed in an amorphous state, and is patterned using oxalic acid series aqueous solution. After that, it is desirable to employ a process in which the ITO film be crystallized by heating, for example, whereby the ITO film is finally chemically stabilized.

However, when the ITO film is changed in phase from the amorphous phase to the crystalline phase, a disordered array of atoms is changed into an ordered array of atoms. Along with such a change, a distance between crystal atoms becomes smaller, whereby volume contraction occurs. As a result, the ITO film is applied with a tensile stress from a substrate. Accordingly, a step disconnection of the ITO film occurs more easily particularly in a step portion such as a contact hole. Measurement results regarding a film stress of an ITO film formed above an Si substrate, which is obtained by the inventors of the present invention, are shown in Table 1. The film stress of an amorphous ITO film obtained immediately after deposition is −200 MPa. That is, a compressive stress of 200 MPa is applied. On the other hand, the film stress obtained by heating the ITO film at 300° C. to be crystallized is +200 MPa. That is, a tensile stress of 200 MPa is applied. From the above results, it is apparent that, in the case of forming the amorphous ITO film, the tensile stress is applied with the progress of the crystallization. On the other hand, in the case of forming the crystallized ITO film, a crystal phase of the ITO film is not changed after heat treatment, with the result that the film stress of the ITO film is not changed. As described above, when the contact hole is coated with the amorphous ITO film, excellent etching workability is obtained, while the coatability is poor. As a result, corrosion of metal wirings due to ingress of water or impurities may occur. To solve the problems, for example, wiring in a base layer can be formed into a two-layer structure (For example, see Japanese Unexamined Patent Application Publication Nos. 10-10576 and 2004-205550).

TABLE 1

(a) Film stress of ITO film formed in amorphous state

| amorphous film obtained immediately after deposition −200 Mpa (compressive stress) | polycrystallized by heat treatment at 300° C. → | polycrystalline film obtained after heat treatment +200 MPa (tensile stress) |
| --- | --- | --- |

(b) Film stress of ITO film formed in polycrystalline state

| polycrystalline film obtained immediately after deposition +200 MPa (tensile stress) | heat treatment at 300° C. → | polycrystalline film obtained after heat treatment +200 MPa (tensile stress) |
| --- | --- | --- |

However, merely by laminating a metallic material, it is impossible to prevent wiring in a base layer from being corroded. Further, there is no disclosure on the problem of a contact hole formed in an area which is not covered with an alignment layer and into which water and impurities are more likely to enter. For example, there is no disclosure on a contact hole formed in an element (drive circuit, test circuit, or the like) disposed in the vicinity of a sealing material.

SUMMARY OF THE INVENTION

The present invention has been made to solve the above-mentioned problems, and it is therefore an object of the present invention to provide a display panel capable of suppressing corrosion or the like of a metal thin film having a terminal, and a method of manufacturing the same.

According to an aspect of the present invention, there is provided a display panel having a first substrate and a second substrate that are bonded together through a sealing material, the display panel including: a first metal thin film formed above the first substrate and having a terminal; a protective transparent conductive film formed above the first metal thin film; an insulating film formed above the protective transparent conductive film and having a contact hole formed outside a display area and inside the sealing material; and a transparent conductive film formed above the insulating film and electrically connected to the first metal thin film through the protective transparent conductive film in the contact hole.

According to another aspect of the present invention, there is provided a method of manufacturing a display panel, the display panel including a first substrate and a second substrate that are bonded together through a sealing material, the method including the steps of: forming, above the first substrate, a metal thin film having a terminal; forming a protective transparent conductive film above the metal thin film; forming, above the protective transparent conductive film, an insulating film having a contact hole formed outside a display area and inside the sealing material; and forming, above the insulating film, a transparent conductive film electrically connected to the metal thin film through the protective transparent conductive film in the contact hole.

According to the present invention, it is possible to provide a display panel capable of suppressing corrosion or the like of a metal thin film having a terminal, and a method of manufacturing the same.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
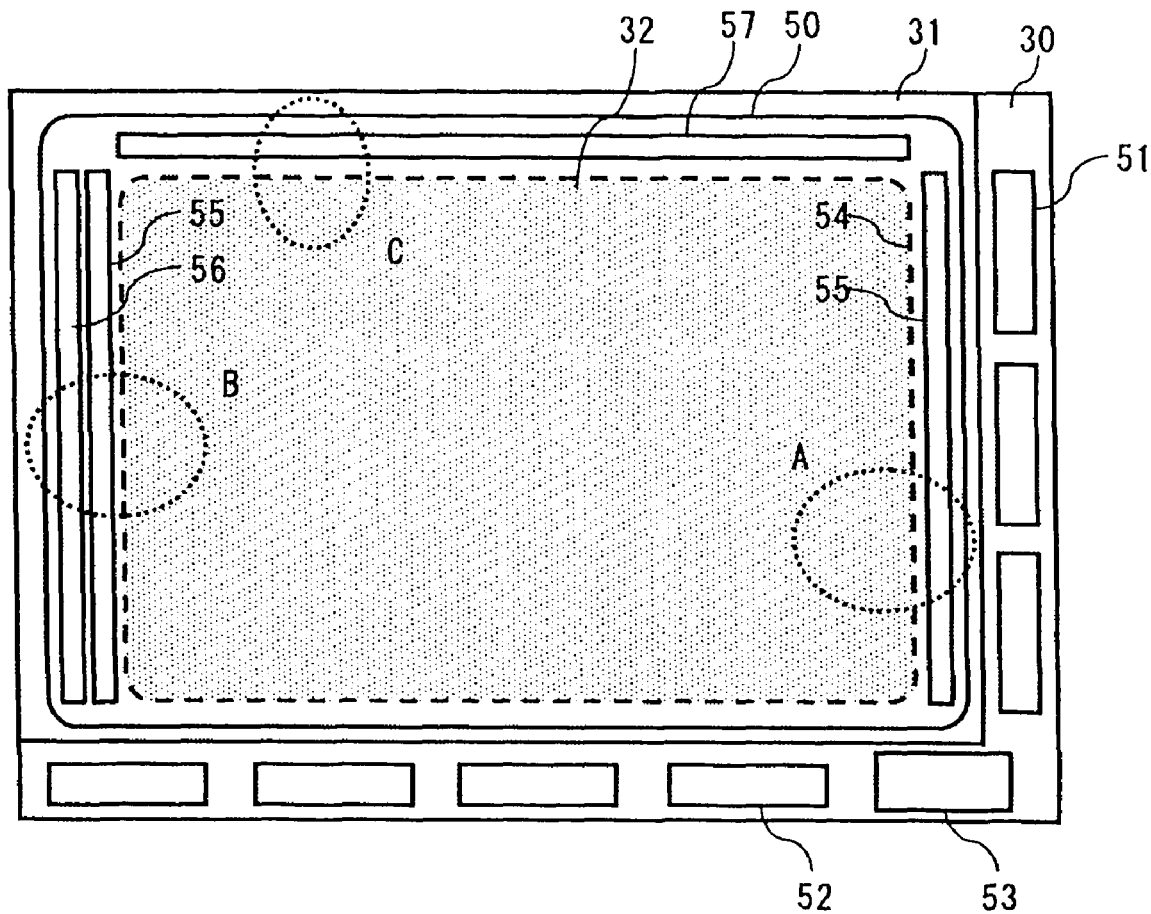
FIG. 1 is a plan view showing the configuration of a liquid crystal display panel according to an embodiment of the present invention.
Figure 2:
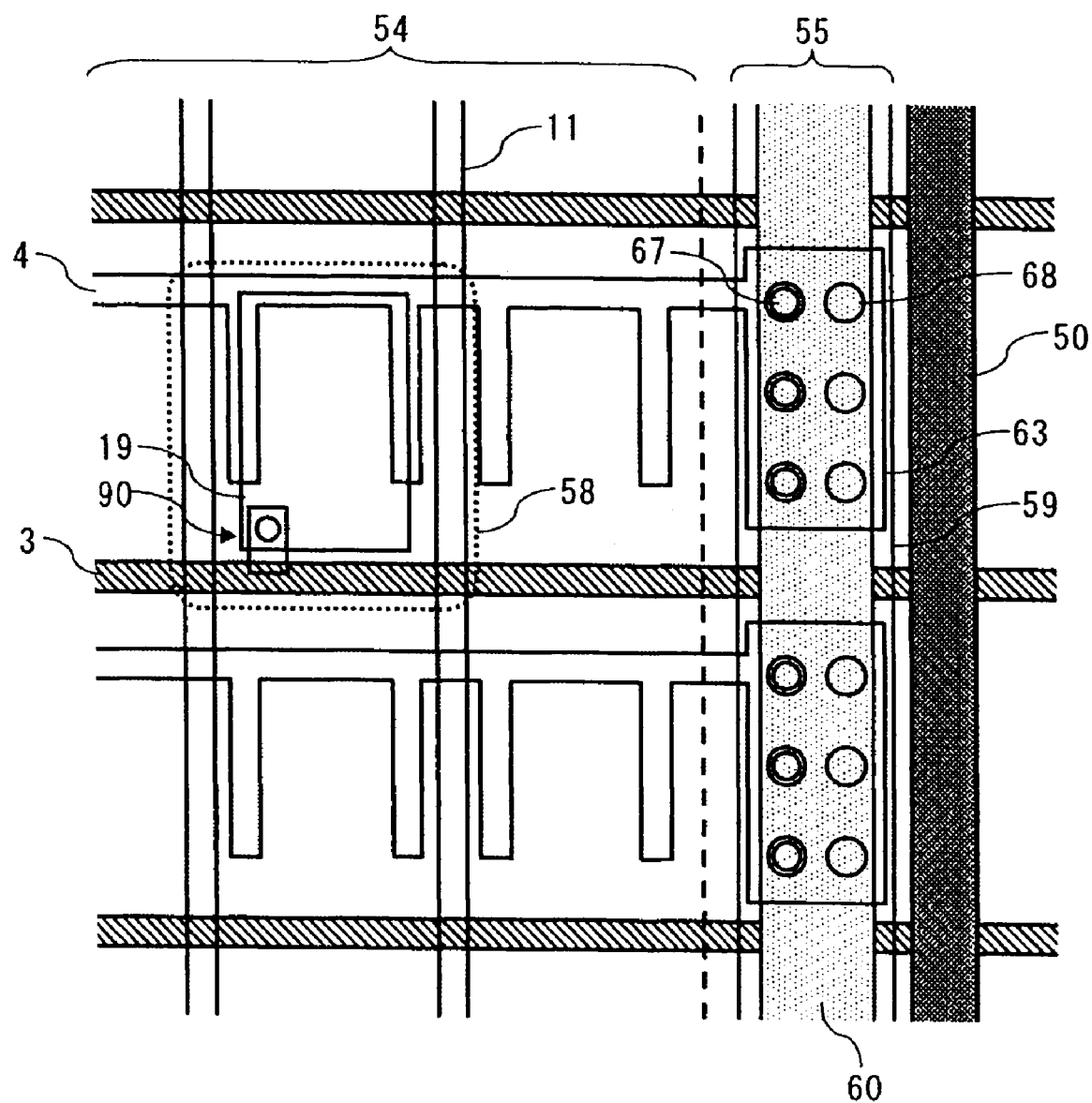
FIG. 2 is an enlarged view showing a portion A of FIG. 1.

Referring to FIGS. 1 and 2, a description is given of a liquid crystal display panel as an example of a display panel. FIG. 1 is a plan view showing the configuration of the liquid crystal display panel. FIG. 2 is an enlarged view showing a portion A of FIG. 1. Note that FIG. 2 shows the configuration of a TFT array substrate.

The liquid crystal display panel includes a TFT array substrate 30 serving as a first substrate, and a counter substrate 31 serving as a second substrate disposed so as to oppose the TFT array substrate 30. The liquid crystal display panel includes the TFT array substrate 30 and the counter substrate 31 that are bonded together at an outer periphery thereof by use of a sealing material 50, with a liquid crystal layer being formed therebetween to be sealed. Inside the sealing material 50, a display area 54 having a plurality of pixels 58 is formed. The TFT array substrate 30 includes TFTs 90, pixel electrodes 19, common wiring contact portions 55, lighting test circuits, and drive circuits 51 and 52 which are described later. The counter substrate 31 includes a color filter layer and a counter electrode. The color filter layer includes, for example, a black matrix (BM) layer, red (R), green (G), and blue (B) pigmented layers. The color filter layer enables each pixel 58 to display red, green, or blue color. In the display area 54, on surfaces on a side of the liquid crystal layer of both the TFT array substrate 30 and the counter substrate 31, an alignment layer 32 is formed.

As shown in FIG. 1, the sealing material 50 is formed into a frame shape so as to surround the display area 54. Outside the sealing material 50, a plurality of scan signal drive circuits 51 and a plurality of display signal drive circuits 52 are connected. The plurality of scan signal drive circuits 51 are provided along a side of the liquid crystal display panel. Similarly, the plurality of display signal drive circuits 52 are provided along another side of the liquid crystal display panel. The one side along which the scan signal drive circuits 51 are provided and the another side along which the display signal drive circuits 52 are provided are orthogonal to each other. On a corner portion therebetween, a lighting test terminal portion 53 is formed. The lighting test terminal portion 53 is supplied with various signals such as a selection signal and a test signal from the outside.

Between the sealing material 50 and the display area 54, there are provided the common wiring contact portions 55, a gate-side lighting test circuit portion 56, and a source-side lighting test circuit portion 57. Those components are formed on the outside of the alignment layer 32, for example. The common wiring contact portions 55 are connected to common wirings 4, which are described later, so as to supply a common signal to the display area 54. The gate-side lighting test circuit portion 56 is connected to gate signal lines 3, which are described later, so as to supply the selection signal to the display area 54 during a lighting test. The source-side lighting test circuit portion 57 is connected to source signal lines 11, which are described later, so as to supply the test signal to the display area 54 during the lighting test. The common wiring contact portions 55 are formed on both sides of the display area 54. The gate-side lighting test circuit portion 56 is formed between the common wiring contact portion 55 and the sealing material 50. The display area 54 is formed between the gate-side lighting test circuit portion 56 and the scan signal drive circuits 51. In addition, the display area 54 is formed between the source-side lighting test circuit portion 57 and the display signal drive circuits 52.

As shown in FIG. 2, in the display area 54, there are formed a plurality of gate signal lines (scan signal wirings) 3, a plurality of common wirings 4, and a plurality of source signal lines (display signal wirings) 11. The plurality of gate signal lines 3 and the plurality of common wirings 4 are provided in parallel with each other. The gate signal lines 3 and the common wirings 4 are alternately provided. The plurality of source signal lines 11 are provided in parallel with each other. The gate signal lines 3 and the source signal lines 11 are formed so as to intersect each other. Similarly, the common wirings 4 and the source signal lines 11 are formed so as to intersect each other. The gate signal lines 3 and the source signal lines 11 are orthogonal to each other. Similarly, the common wirings 4 and the source signal lines 11 are orthogonal to each other. Further, the gate signal lines 3 extend from the vicinity of the gate-side lighting test circuit portion 56 to the scan signal drive circuits 51. The source signal lines 11 extend from the source-side lighting test circuit portion 57 to the display signal drive circuits 52. In this configuration, various signals from the scan signal drive circuits 51, the display signal drive circuits 52, the gate-side lighting test circuit portion 56, or the source-side lighting test circuit portion 57 are supplied to each signal line. The common wirings 4 extend from one of the opposed common wiring contact portions 55 to the opposed common wiring contact portion 55. Each area surrounded by the gate signal line 3 and the common wiring 4, which are adjacent to each other, and by the adjacent source signal lines 11 corresponds to each pixel 58. Accordingly, in the liquid crystal display panel, the pixels 58 are arrayed in a matrix form. The configuration of each common wiring contact portion 55 and each pixel 58 will be described later.

The scan signal drive circuits 51 and the display signal drive circuits 52 are each supplied with various signals from the outside. The scan signal drive circuits 51 each supply a gate signal (scan signal) to the gate signal lines 3 in response to a control signal from the outside. In response to the gate signal, the gate signal lines 3 are sequentially selected. The display signal drive circuits 52 each supply a display signal (display voltage) to the source signal lines 11 based on the control signal or display data from the outside. Thus, the display voltage corresponding to the display data can be supplied to each pixel 58. Note that the scan signal drive circuits 51 and the display signal drive circuits 52 are not necessarily arranged on the liquid crystal display panel. For example, those drive circuits may be connected via tape carrier package (TCP).

In each pixel 58, at least one TFT 90 is formed. The TFT 90 is formed in the vicinity of an intersection between the source signal line 11 and the gate signal line 3. For example, the TFT 90 supplies the display voltage to a pixel electrode 19. A gate electrode of the TFT 90 serving as a switching element is connected to the gate signal line 3 so as to control turning on/off of the TFT 90 in response to a signal input from a gate terminal. A source electrode of the TFT 90 is connected to the source signal line 11. When a voltage is applied to the gate electrode, a current is caused to flow from the source signal line 11. As a result, the display voltage is applied from the source signal line 11 to the pixel electrode 19 connected to a drain electrode of the TFT 90. Then, between the pixel electrode 19 and the counter electrode, an electric field corresponding to the display voltage is generated.

In the common wiring contact portions 55, a common metal thin film 59 and a common transparent conductive film 60 are formed in parallel with the source signal lines 11. Further, one end of each of the common wirings 4, the common metal thin film 59, and the common transparent conductive film 60 are sequentially overlapped with each other via insulating films. In the common wiring contact portion 55, each overlapped portion corresponds to a source/gate conversion portion 63 serving as a layer conversion portion.

Note that at the layer conversion portion, the conductive films formed in different layers are electrically connected to each other. Specifically, a first metal wiring formed in the same layer as the gate signal lines 3, and a second metal wiring formed in the same layer as the source signal lines 11 are electrically connected to each other via a transparent conductive film formed above those layers. In other words, the source of the source/gate conversion portion 63 indicates the same layer as the source signal lines 11. The gate of the source/gate conversion portion 63 indicates the same layer as the gate signal lines 3.

The source/gate conversion portion 63 includes an ITO/gate contact portion 67 and an ITO/source contact portion 68. In FIG. 2, three ITO/gate contact portions 67 and three ITO/source contact portions 68 are formed in the source/gate conversion portion 63 of the common wiring contact portion 55. The ITO/gate contact portion 67 electrically connects a first metal thin film (common wiring 4 in this case) formed in the same layer as the gate signal lines 3 to a transparent conductive film (common transparent conductive film 60 in this case) formed above the first metal thin film. In addition, the ITO/source contact portion 68 electrically connects a second metal thin film (common metal thin film 59 in this case) formed in the same layer as the source signal lines 11 to a transparent conductive film (common transparent conductive film 60 in this case) formed above the second metal thin film.

In this manner, through the common transparent conductive film 60, the common wirings 4 and the common metal thin film 59 are electrically connected to each other. The first metal thin film and the second metal thin film, which are formed in different layers, can be electrically connected to each other with the transparent conductive film being used as a bridge. In this configuration, the common signals from the common metal thin film 59 or the common transparent conductive film 60 formed in the common wiring contact portion 55 are supplied to the plurality of common wirings 4. Note that the common wiring contact portion 55 formed at the other end of each of the common wirings 4, that is, formed on the opposite side has the same configuration.

Figure 3:
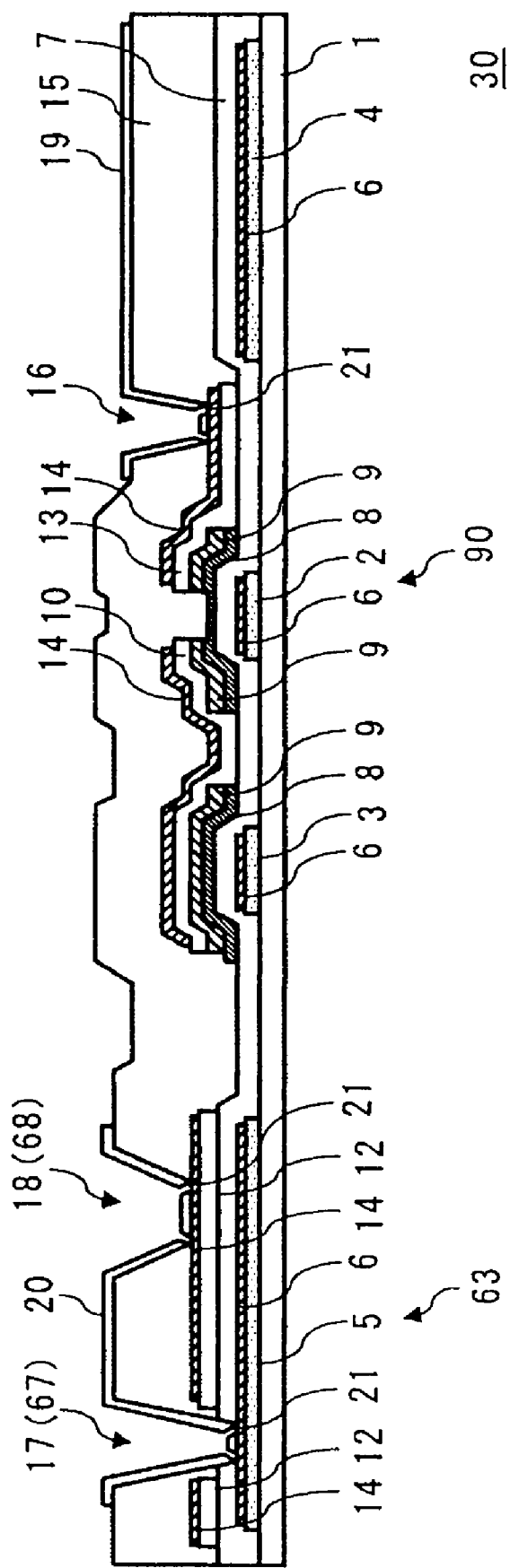
FIG. 3 is a cross-sectional view showing the configuration of a TFT array substrate of the liquid crystal display panel according to the embodiment of the present invention.
Figure 8:
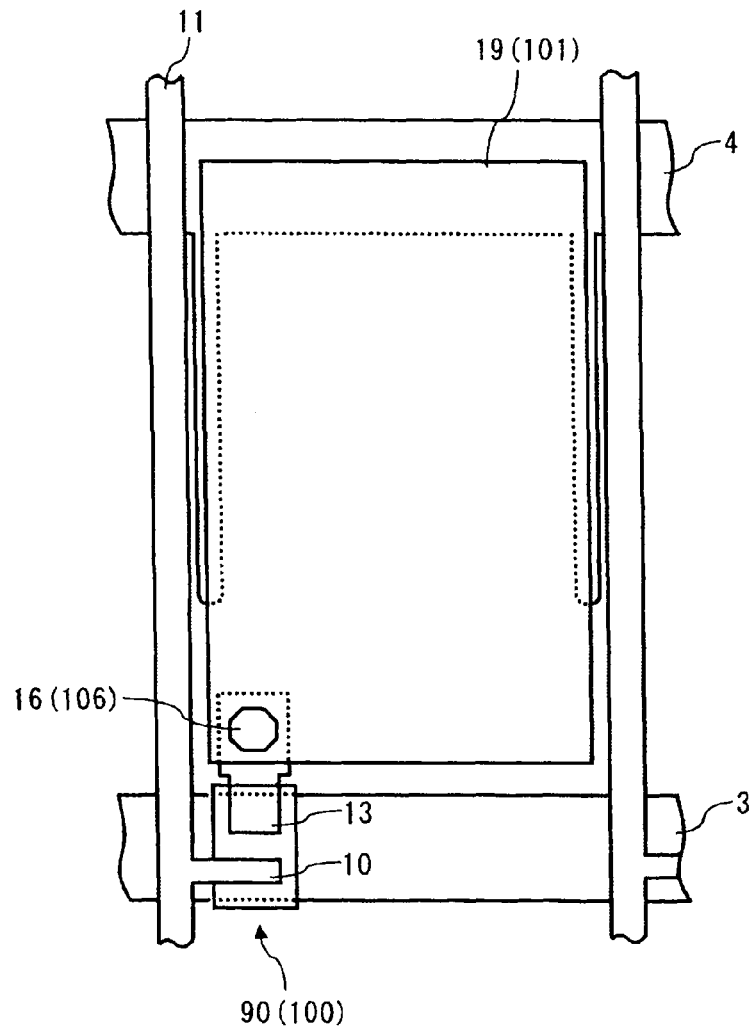
FIG. 8 is a plan view showing the configuration of each of a TFT and a pixel electrode portion of a transmissive liquid crystal display panel of a related art.
Figure 9:
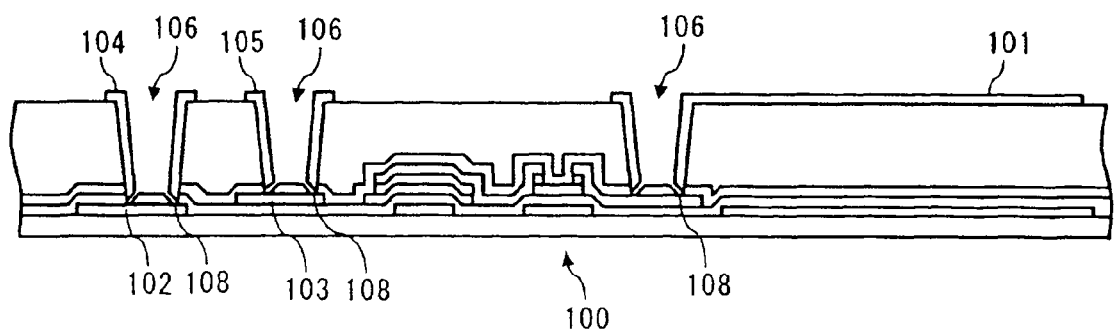
FIG. 9 is a cross-sectional view showing the configuration of each of the TFT and the pixel electrode portion of the transmissive liquid crystal display panel of the related art.
Figure 10:
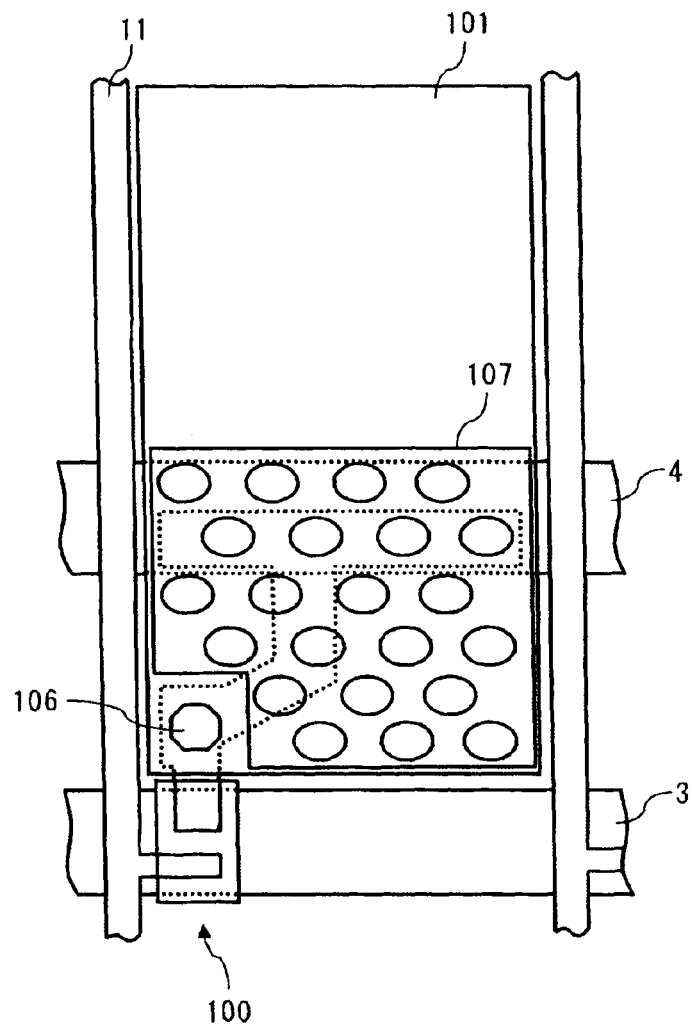
FIG. 10 is a plan view showing the configuration of each of a TFT and a pixel electrode portion of a transflective liquid crystal display panel of a related art.
Figure 11:
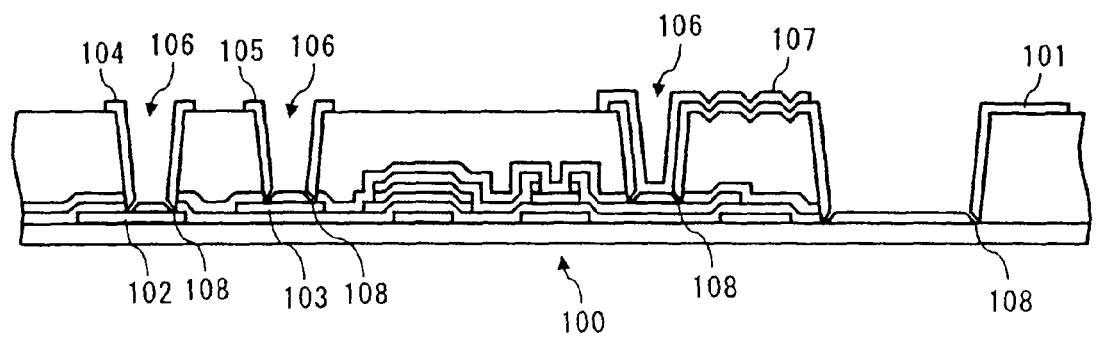
FIG. 11 is a cross-sectional view showing the configuration of each of the TFT and the pixel electrode portion of the transflective liquid crystal display panel of the related art.
Figure 12:
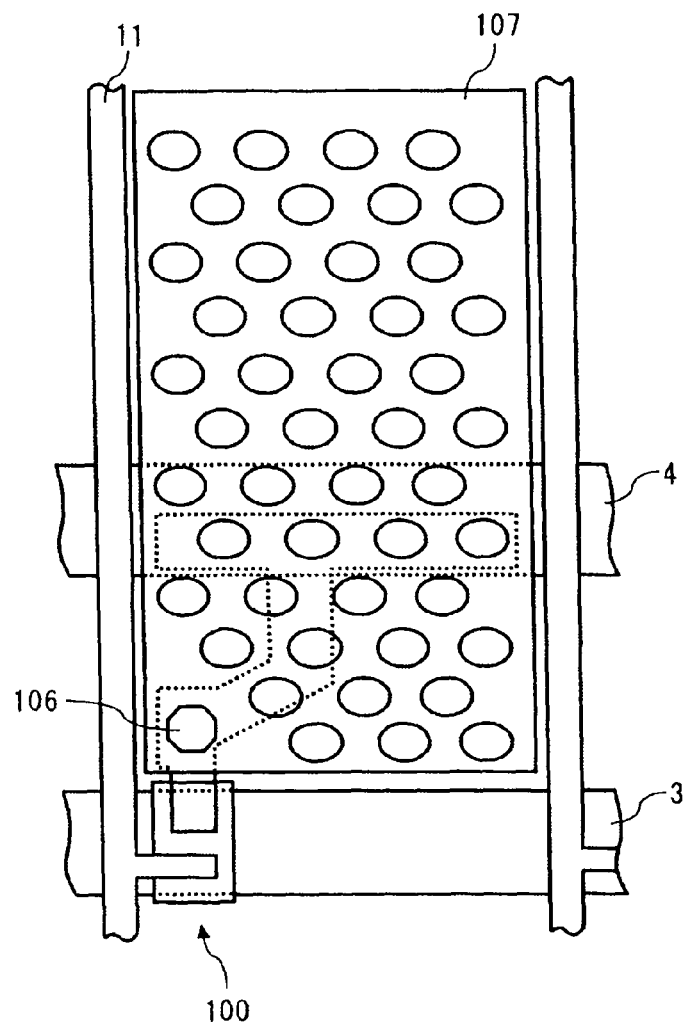
FIG. 12 is a plan view showing the configuration of each of a TFT and a pixel electrode portion of a reflective liquid crystal display panel of a related art.
Figure 13:
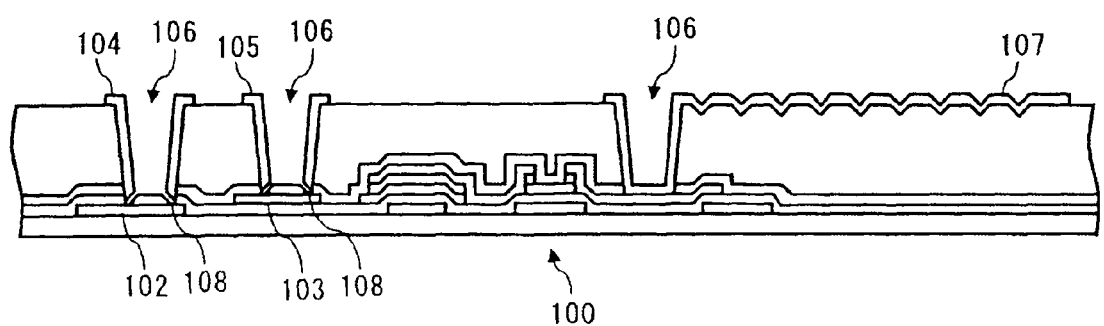
FIG. 13 is a cross-sectional view showing the configuration of each of the TFT and the pixel electrode portion of the reflective liquid crystal display panel of the related art.

Next, the configuration of each of the pixel 58 and the layer conversion portion is described in detail with reference to FIG. 3. FIG. 3 is a cross-sectional view showing the configuration of the TFT array substrate 30. In FIG. 3, the configuration of the pixel 58 is shown on the right side, and the configuration of the layer conversion portion is shown on the left side. In this case, as an example of the layer conversion portion, the source/gate conversion portion 63 of the common wiring contact portion 55 is described. Further, in FIG. 3, the configuration of the pixel 58 is similar to that of the pixel of the transmissive liquid crystal display panel shown in FIG. 8. The configuration of each pixel of the transflective liquid crystal display panel and the reflective liquid crystal display panel shown in FIGS. 10 and 12, respectively, can also be applied.

The gate electrode 2, the gate signal line 3, the common wiring 4, and a first terminal 5 are formed on a transparent insulating substrate 1 made of glass or the like. The gate signal line 3 includes the gate electrode 2, and has a gate terminal at an end thereof. The gate electrode 2 forms each TFT 90 serving as a switching element. Further, on the TFT array substrate 30, there are disposed the scan signal drive circuits 51 to each of which various signals are supplied from the outside. A pad and a gate terminal provided to each of the scan signal drive circuits 51 are electrically connected to each other. Thus, the scan signal from each of the scan signal drive circuits 51 is input to each of the gate signal lines 3 through the gate terminal. Then, the gate signal lines 3 each transmit the scan signal to the gate electrode 2.

The common wiring 4 is disposed between the adjacent gate signal lines 3. A part of the common wiring 4 extends along the source signal lines 11. The common wiring 4 constitutes an auxiliary capacity for holding a voltage applied to a pixel electrode for a predetermined period of time. Further, the common wiring 4 has the first terminal 5 at an end thereof. The first terminal 5 is supplied with the common signal from the outside. As a result, the common signal from the outside is input to the common wiring 4 through the first terminal 5.

The wirings, electrodes, or terminals such as the gate electrode 2, the gate signal line 3, the common wiring 4, and the first terminal 5, which are formed on the insulating substrate 1, can be formed using the first metal thin film. In the embodiment of the present invention, on the first metal thin film, a first transparent conductive film 6 is formed as a protective transparent conductive film. The first transparent conductive film 6 is formed in a size a little smaller than each pattern (gate electrode 2, gate signal line 3, common wiring 4, first terminal 5, or the like) of the first metal thin film. The first transparent conductive film 6 is formed within each pattern of the first metal thin film.

A gate insulating film 7 made of a transparent inorganic insulating material is formed so as to cover the gate electrode 2, the gate signal line 3, the common wiring 4, the first terminal 5, and the first transparent conductive film 6. A semiconductor film 8 is formed above the gate electrode 2 with the gate insulating film 7 interposed therebetween, to thereby form the TFT 90. In addition, the semiconductor film 8 is formed above the gate signal line 3 with the gate insulating film 7 interposed therebetween. The semiconductor film 8 is formed in a size larger than each pattern of the gate electrode 2 and the gate signal line 3. An ohmic contact film 9 is formed on the semiconductor film 8. Above the gate electrode 2, a part of the ohmic contact film 9 is removed. Accordingly, above the gate electrode 2, the ohmic contact film 9 is disposed at both ends of the semiconductor film 8. A region in which one part of the ohmic contact film 9 is formed corresponds to a source region, and a region in which the other of the ohmic contact film 9 is formed corresponds to a drain region. When the ohmic contact film 9 is removed, a region between the source region and the drain region becomes a channel region.

A source electrode 10 extends from the source signal line 11 and forms the TFT 90. Further, the source electrode 10 is formed on the ohmic contact film 9 on an opposite side of the common wiring 4. The source signal line 11 has a source terminal at an end thereof. On the TFT array substrate 30, there is disposed a display signal drive circuit 52 to which various signals from the outside are supplied. A pad and a source terminal provided to the display signal drive circuit 52 are electrically connected to each other. As a result, the display signal from the display signal drive circuit 52 is input to the source signal line 11 through the source terminal. Then, the source signal line 11 transmits the display signal to the source electrode 10.

On the ohmic contact film 9 on the side of the common wiring 4, a drain electrode 13 is formed. The drain electrode 13 forms the TFT 90. A second terminal 12 is formed above the first terminal 5 with the gate insulating film 7 interposed therebetween. Note that the second terminal 12 is formed in the common metal thin film 59 and has an opening. The second terminal 12 and the first terminal 5 are electrically connected to each other via a terminal pad 20 described later. As a result, the common signal supplied to the common metal thin film 59 formed in a layer different from that of the first terminal 5 is input to the first terminal 5 through the second terminal 12. The common signal may be supplied to the common transparent conductive film 60 and may be input to the first terminal 5 through the terminal pad 20. The wirings, electrodes, or terminals such as the source electrode 10, the source signal line 11, the second terminal 12, and the drain electrode 13 that are formed above the first metal thin film can be formed using the second metal thin film. In the embodiment of the present invention, on each second metal thin film, a second transparent conductive film 14 is formed as the protective transparent conductive film. The second transparent conductive film 14 is formed in a size a little smaller than each pattern (source electrode 10, source signal line 11, second terminal 12, drain electrode 13, or the like) of the second metal thin film. In addition, the second transparent conductive film 14 is formed within each pattern of the second metal thin film.

An interlayer insulating film 15 is made of a transparent inorganic insulating material and is formed so as to cover the TFT 90. In other words, the interlayer insulating film 15 is formed on the second transparent conductive film 14. Above the drain electrode 13, a pixel contact hole 16 is formed. Specifically, above the second transparent conductive film 14 formed on the drain electrode 13, the pixel contact hole 16 is formed. The pixel contact hole 16 is formed so as to penetrate the interlayer insulating film 15. Above the first terminal 5, the ITO/gate contact portion 67 is formed in the opening of the second terminal 12. The ITO/gate contact portion 67 has a first terminal portion contact hole 17. Specifically, above the first transparent conductive film 6 formed on the first terminal 5, the first terminal portion contact hole 17 is formed. The first terminal portion contact hole 17 is formed so as to penetrate both the gate insulating film 7 and the interlayer insulating film 15. In addition, above the second terminal 12, the ITO/source contact portion 68 is provided. The ITO/source contact portion 68 has a second terminal portion contact hole 18. Specifically, above the second transparent conductive film 14 formed on the second terminal 12, the second terminal portion contact hole 18 is formed. The second terminal portion contact hole 18 is formed so as to penetrate the interlayer insulating film 15.

The pixel electrode 19 is formed on the interlayer insulating film 15. Further, the pixel electrode 19 is filled in the pixel contact hole 16, and is connected to the second transparent conductive film 14 formed on the drain electrode 13. In other words, the pixel electrode 19 is electrically connected to the drain electrode 13, which is formed below the pixel electrode 19, via the pixel contact hole 16. The pixel electrode 19 is formed in an area between the gate signal line 3 and the common wiring 4, which are adjacent to each other, other than the TFT 90. The pixel electrode 19 overlaps at least a part of each of the drain electrode 13 and the common wiring 4. Specifically, the pixel electrode 19 overlaps the common wiring 4, which is formed below the pixel electrode 19, with the gate insulating film 7 and the interlayer insulating film 15 interposed therebetween. As a result, an electric charge is stored between the common wiring 4 and the pixel electrode 19. The common wiring 4 forms an auxiliary capacity for holding a voltage applied to the pixel electrode 19 for a predetermined period of time. The pixel electrode 19 is formed of a transparent conductive film, that is, an optically-transparent conductive film and applies a signal potential to the liquid crystal layer.

The terminal pad 20 is formed on the interlayer insulating film 15. Further, the terminal pad 20 is filled in the first terminal portion contact hole 17, and is connected to the first transparent conductive film 6 formed on the first terminal 5. In other words, the terminal pad 20 is electrically connected to the first terminal 5, which is formed below the terminal pad 20, through the first terminal portion contact hole 17. Further, the terminal pad 20 is filled in the second terminal portion contact hole 18, and is connected to the second transparent conductive film 14 formed on the second terminal 12. Specifically, the terminal pad 20 is electrically connected to the second terminal 12, which is formed below the terminal pad 20, through the second terminal portion contact hole 18. Thus, the terminal pad 20 is formed over the first terminal portion contact hole 17 and the second terminal portion contact hole 18 so as to electrically connect the first terminal 5 and the second terminal 12. The terminal pad 20 can be formed of the transparent conductive film identical with that of the pixel electrode 19. The pixel 58 and the layer conversion portion of the TFT array substrate 30 are configured as described above.

In the embodiment of the present invention, the pixel electrode 19 and the terminal pad 20 that are formed of the transparent conductive film are formed in a step portion like a contact hole. In the step portion, the coverage defect occurs in those patterns. In coverage defect portions 21, water and impurities enter the lower layer of the pixel electrode 19 or the terminal pad 20. In view of this, in the embodiment of the present invention, the first transparent conductive film 6 or the second transparent conductive film 14 is formed in the contact hole having the coverage defect portion 21. Specifically, the contact hole has a two-layer structure including one of the pixel electrode 19 and the terminal pad 20, and one of the first transparent conductive film 6 and the second transparent conductive film 14. As a result, in the coverage defect portions 21, the wirings, electrodes, or terminals formed of the first metal thin film or the second metal thin film are not exposed, but the first transparent conductive film 6 or the second transparent conductive film 14 is exposed. In other words, also in the coverage defect portions 21, the wirings, electrodes, or terminals are coated with the protective transparent conductive film. For this reason, even when water enters from the coverage defect portions 21 of the transparent conductive film forming the pixel electrode 19 and the like, the protective transparent conductive film prevents water or the like from entering the metal thin film. In other words, effects of water or the like on the electrodes, wirings, or terminals formed below the protective transparent conductive film can be suppressed. Accordingly, corrosion and electrical corrosion of the wirings, terminals, or electrodes formed of the metal thin film can be suppressed, whereby an excellent drive performance can be secured. As a result, excellent display characteristics of the liquid crystal display panel can be provided.

In FIG. 3, the protective transparent conductive film is formed on the first metal thin film and on the second metal thin film, but the protective transparent conductive film may be formed at any position. The protective transparent conductive film may be formed on one of the metal thin films. In a given area such as the vicinity of the inside of the sealing material 50, the protective transparent conductive film may be formed on the first metal thin film and on the second metal thin film. Also, the protective transparent conductive film can be applied to terminals other than the layer conversion portion.

Figure 4:
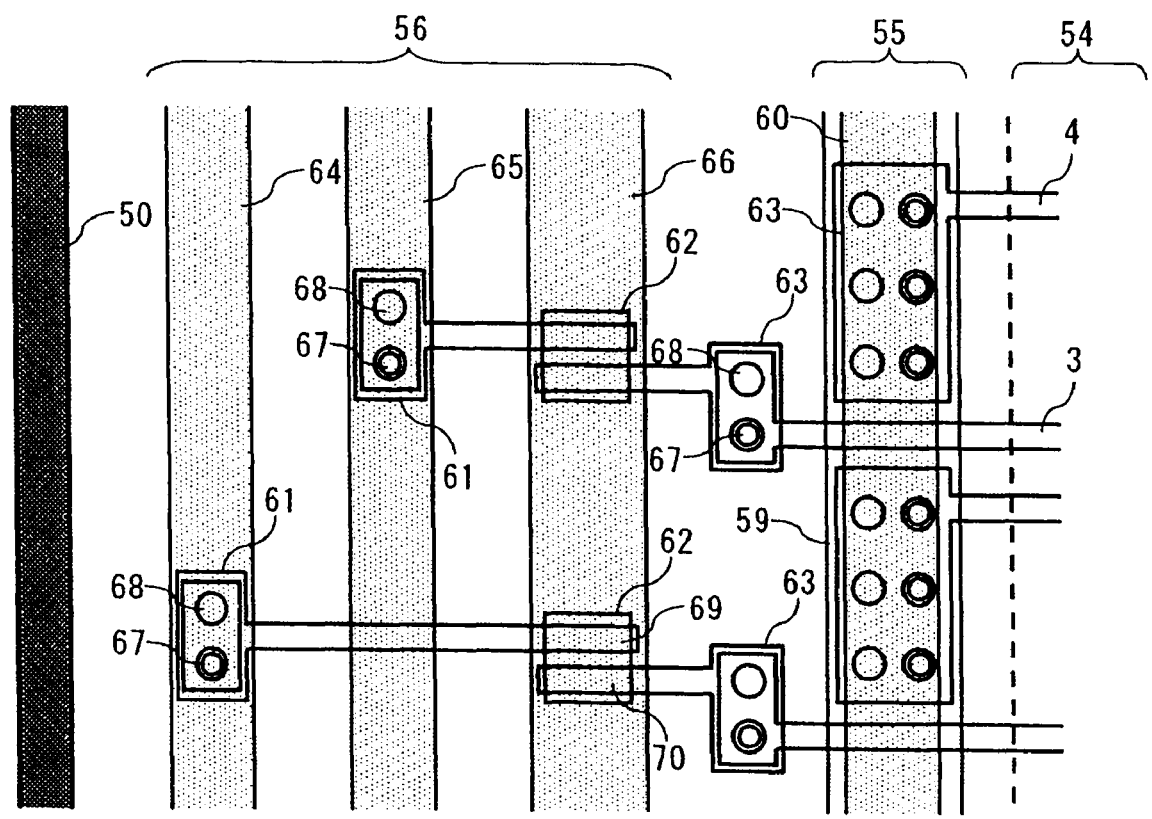
FIG. 4 is an enlarged view showing a portion B of FIG. 1.
Figure 5:
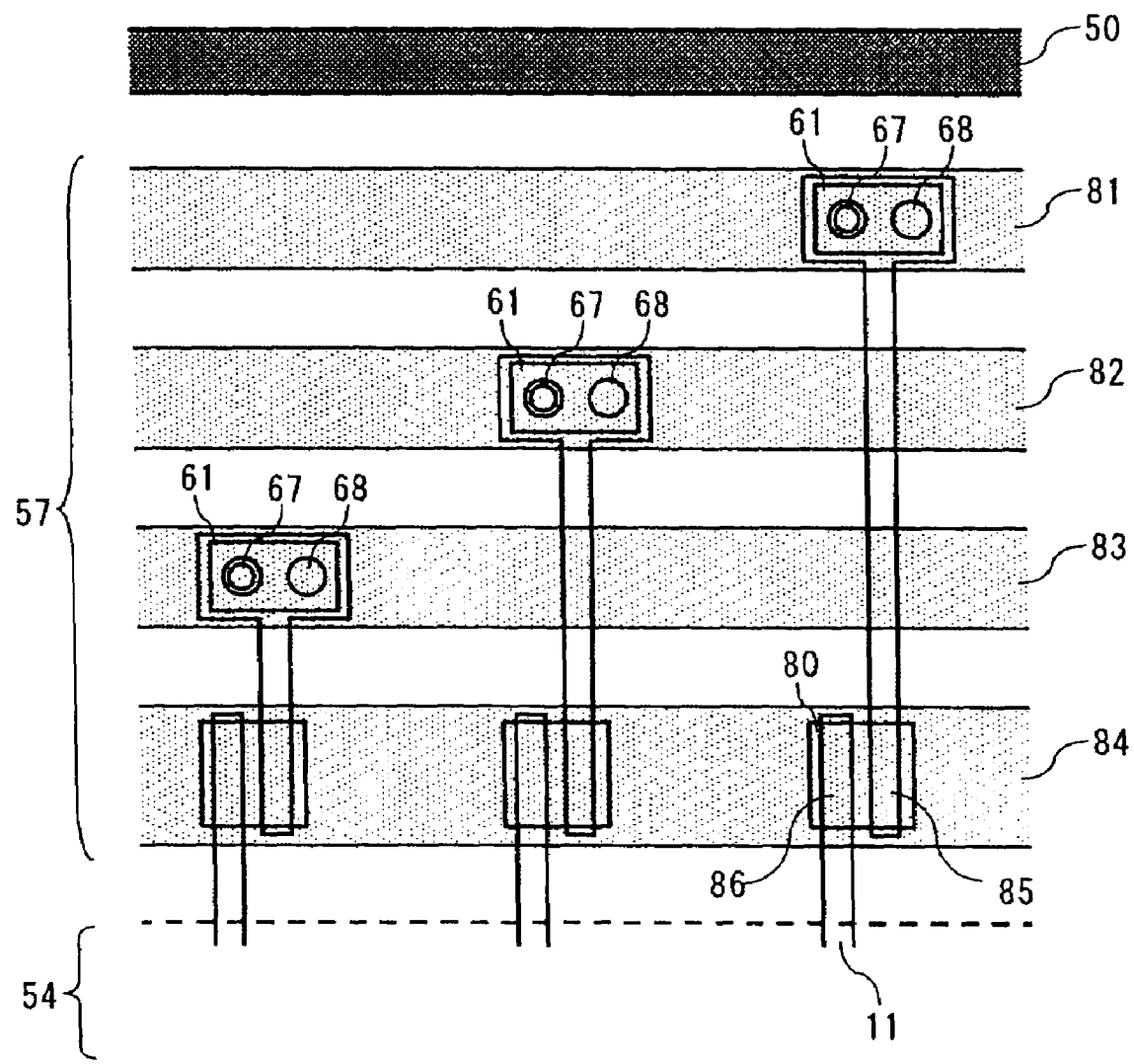
FIG. 5 is an enlarged view showing a portion C of FIG. 1.

Next, a description is given of the lighting test circuit with reference to FIGS. 4 and 5. FIG. 4 is an enlarged view showing a portion B of FIG. 1. FIG. 5 is an enlarged view showing a portion C of FIG. 1. Note that FIGS. 4 and 5 each show the configuration of the TFT array substrate 30.

The lighting test circuit includes the gate-side lighting test circuit portion 56 and the source-side lighting test circuit portion 57. First, the gate-side lighting test circuit portion 56 is described. As shown in FIG. 4, a gate/source conversion portion 61, a gate-side lighting test TFT 62, and the source/gate conversion portion 63 are sequentially formed from a side of the sealing material 50 (from opposite side of display area 54) so as to correspond to each gate signal line 3. A first gate signal supply wiring 64 and a second gate signal supply wiring 65 are formed in parallel with the source signal lines 11. Similarly, also a gate-side TFT controlling gate signal line 66 is formed in parallel with the source signal line 11. The gate-side TFT controlling gate signal line 66 supplies a gate signal to the gate-side lighting test TFT 62. The gate/source conversion portion 61, the gate-side lighting test TFT 62, the source/gate conversion portion 63, the first gate signal supply wiring 64, the second gate signal supply wiring 65, and the gate-side TFT controlling gate signal line 66 form the gate-side lighting test circuit portion 56. The gate/source conversion portion 61 serving as the layer conversion portion is connected to the first gate signal supply wiring 64 or the second gate signal supply wiring 65. Specifically, a plurality of gate/source conversion portions 61 are provided so as to correspond to the plurality of gate signal lines 3. The plurality of gate/source conversion portions 61 are alternately connected to the first gate signal supply wiring 64 and the second gate signal supply wiring 65. For example, the gate/source conversion portions 61 corresponding to the gate signal lines 3 of even number rows are connected to the first gate signal supply wiring 64. The gate/source conversion portions 61 corresponding to the gate signal lines 3 of odd number rows are connected to the second gate signal supply wiring 65.

The gate/source conversion portions 61 and the source/gate conversion portions 63 each include the ITO/gate contact portion 67 and the ITO/source contact portion 68. Note that the layer conversion portions each has the same configuration as that of the layer conversion portion of the common wiring contact portion 55. Specifically, the gate/source conversion portion 61 each have the same configuration as that of the source/gate conversion portion 63 shown in FIG. 3. In the gate/source conversion portion 61 or the source/gate conversion portion 63, with the transparent conductive film being used as a bridge, the first metal thin film and the second metal thin film that are formed in different layers can be electrically connected to each other. In this configuration, in the gate/source conversion portion 61, the first metal thin film (gate signal supply wiring in this case) formed in the same layer as the gate signal lines 3 is connected to the second metal thin film formed in the same layer as the source signal lines 11.

The second metal thin film connected by the gate/source conversion portion 61 extends to the gate-side lighting test TFT 62 and serves as a gate-side lighting test source electrode 69. A gate-side lighting test drain electrode 70 of the gate-side lighting test TFT 62 extends to the source/gate conversion portion 63. The source/gate conversion portion 63 connects the second metal thin film formed in the same layer as the source signal lines 11, to the first metal thin film formed in the same layer as the gate signal lines 3. Specifically, the source/gate conversion portion 63 electrically connects the gate-side lighting test drain electrode 70 to the gate signal line 3.

An end of each of the first gate signal supply wiring 64, the second gate signal supply wiring 65, and the gate-side TFT controlling gate signal line 66 has a terminal in the lighting test terminal portion 53 shown in FIG. 1. Various signals are supplied to those terminals from the outside. As a result, various signals are supplied from the lighting test terminal portion 53 to the first gate signal supply wiring 64, the second gate signal supply wiring 65, and the gate-side TFT controlling gate signal line 66. In other words, through the gate/source conversion portion 61, the selection signal is supplied to the gate-side lighting test source electrode 69 of the gate-side lighting test TFT 62. Then, when a voltage is applied to the gate-side TFT controlling gate signal line 66 and the gate-side lighting test TFT 62 is turned on, the selection signal is supplied to the gate signal line 3 from the gate-side lighting test drain electrode 70 through the source/gate conversion portion 63. As described above, the gate/source conversion portions 61 corresponding to the gate signal lines 3 of the even number rows are connected to the first gate signal supply wiring 64. On the other hand, the gate/source conversion portions 61 corresponding to the gate signal lines 3 of the odd number rows are connected to the second gate signal supply wiring 65. As a result, the selection signal is supplied to the first gate signal supply wiring 64 or the second gate signal supply wiring 65, whereby the gate signal lines 3 of the even number rows or the odd number rows can be selectively driven.

Next, the source-side lighting test circuit portion 57 is described. As shown in FIG. 5, the gate/source conversion portion 61 and a source-side lighting test TFT 80 are sequentially formed from the side of the sealing material 50 (from opposite side of display area 54 side) so as to correspond to each source signal line 11. A source power supply line for R (red) 81, a source power supply line for G (green) 82, and a source power supply line for B (blue) 83 are formed perpendicular to the source signal lines 11. The source power supply line for R 81 corresponds to the source signal line 11 of the pixel 58 for displaying red color, and the source power supply line for G 82 corresponds to the source signal line 11 of the pixel 58 for displaying green color. The source power supply line for B 83 corresponds to the source signal line 11 of the pixel 58 for displaying blue color. As in the case of the source power supply line, a source-side TFT controlling gate signal line 84 is formed perpendicular to the source signal lines 11. The source-side TFT controlling gate signal line 84 supplies the gate signal to the source-side lighting test TFT 80. The gate/source conversion portion 61, the source-side lighting test TFT 80, the source power supply line for R 81, the source power supply line for G 82, the source power supply line for B 83, and the source-side TFT controlling gate signal line 84 form the source-side lighting test circuit portion 57.

The gate/source conversion portion 61 is connected to any one of the source power supply line for R 81, the source power supply line for G 82, and the source power supply line for B 83. For example, the gate/source conversion portion 61 corresponding to the source signal line 11 at a first line is connected to the source power supply line for R 81. The gate/source conversion portion 61 corresponding to the source signal line 11 at a second line is connected to the source power supply line for G 82. The gate/source conversion portion 61 corresponding to the source signal line 11 at a third line is connected to the source power supply line for B 83.

As in the case of the gate-side lighting test circuit portion 56, the gate/source conversion portion 61 includes the ITO/gate contact portion 67 and the ITO/source contact portion 68. In this configuration, in the gate/source conversion portion 61, the first metal thin film (source power supply line in this case) formed in the same layer as the gate signal lines 3 is connected to the second metal thin film formed in the same layer as the source signal lines 11. The pattern of the second metal thin film connected by the gate/source conversion portion 61 extends to the source-side lighting test TFT 80 and serves as the source-side lighting test source electrode 85. In addition, a source-side lighting test drain electrode 86 of the source-side lighting test TFT 80 is electrically connected to the source signal line 11.

An end of each of the source power supply line for R 81, the source power supply line for G 82, the source power supply line for B 83, and the source-side TFT controlling gate signal line 84 has a terminal in the lighting test terminal portion 53 shown in FIG. 1. Various signals from the outside are supplied to those terminals. As a result, various signals are input from the lighting test terminal portion 53 to the source power supply line for R 81, the source power supply line for G 82, the source power supply line for B 83, and the source-side TFT controlling gate signal line 84. In other words, the test signal is supplied to the source-side lighting test source electrode 85 of the source-side lighting test TFT 80 through the gate/source conversion portion 61. Then, when a voltage is applied to the source-side TFT controlling gate signal line 84 and the source-side lighting test TFT 80 is turned on, the test signal is supplied from the source-side lighting test drain electrode 86 to the source signal line 11. As described above, the gate/source conversion portion 61 is connected to any one of the source power supply line for R 81, the source power supply line for G 82, and the source power supply line for B 83. Accordingly, the test signal is input to any one of the source power supply line for R 81, the source power supply line for G 82, and the source power supply line for B 83, whereby the source signal lines 11 can be selectively driven.

For example, in the gate-side lighting test circuit portion 56, the first gate signal supply wiring 64 is selectively driven. Specifically, only the TFTs 90 corresponding to the gate signal lines 3 of the even number rows are turned on, and the other TFTs 90 are turned off. Then, in the source-side lighting test circuit portion 57, the source power supply line for R 81 is selectively driven. Specifically, only the TFTs 90 corresponding to the pixels 58 for displaying red color are turned on, and the other TFTs 90 are turned off. Further, light is irradiated from a backlight unit serving as a light source disposed on the rear surface of the liquid crystal display panel. Thus, it is possible to execute a lighting test for the pixels 58 for displaying red color corresponding to the gate signal lines 3 of the even number rows. As a result, defect pixels can be easily detected. The lighting test circuit is configured as described above.

From a gap between the sealing material 50 and the TFT array substrate 30 and the counter substrate 31 which are bonded together with the sealing material 50, water, impurities, and the like enter from the outside. On the surfaces on the liquid crystal layer side of both the TFT array substrate 30 and the counter substrate 31, the alignment layer 32 is formed. However, outside the display area 54, the alignment layer 32 is not formed. For this reason, the outside of the display area 54 and the inside of the sealing material 50, in particular, the vicinity of the inside of the sealing material 50 are more likely to be affected by water, impurities, and the like. As described above, in this area, the lighting test circuit and the like are disposed and a large number of contact holes are formed. The transparent conductive film is connected to the wiring, terminals, electrodes, and the like, which are made of the metal thin film formed as a lower layer via the contact holes. In the contact holes, the coverage defect of the transparent conductive film is more likely to occur. Accordingly, in a part of the contact holes, the metal thin film is not coated with the transparent conductive film, with the result that the metal thin film is exposed in some parts. As described above, since the vicinity of the inside of the sealing material 50 is more likely to be affected by water, impurities, and the like, in the coverage defection portion caused in the contact hole formed in the vicinity of the inside of the sealing material 50, the metal thin film comes in contact with water, impurities, and the like. Then, the wirings, terminals, electrodes, and the like formed of the metal thin film are corroded or electrically corroded by oxidation or the like, which makes it impossible to secure the excellent drive performance. As a result, the display characteristics of the liquid crystal display panel deteriorate. In the embodiment of the present invention, in the contact holes, the transparent conductive film is formed into a two-layer structure, whereby the metal thin film is hardly affected by water, impurities, and the like. Accordingly, the corrosion and electrical corrosion of the wirings, terminals, electrodes, and the like made of the metal thin film are suppressed, thereby making it possible to secure the excellent drive performance. As a result, even when the contact holes are formed in the vicinity of the inside of the sealing material 50 so as to reduce the frame size of the liquid crystal display panel, excellent display characteristics of the liquid crystal display panel can be provided.

Figure 6:
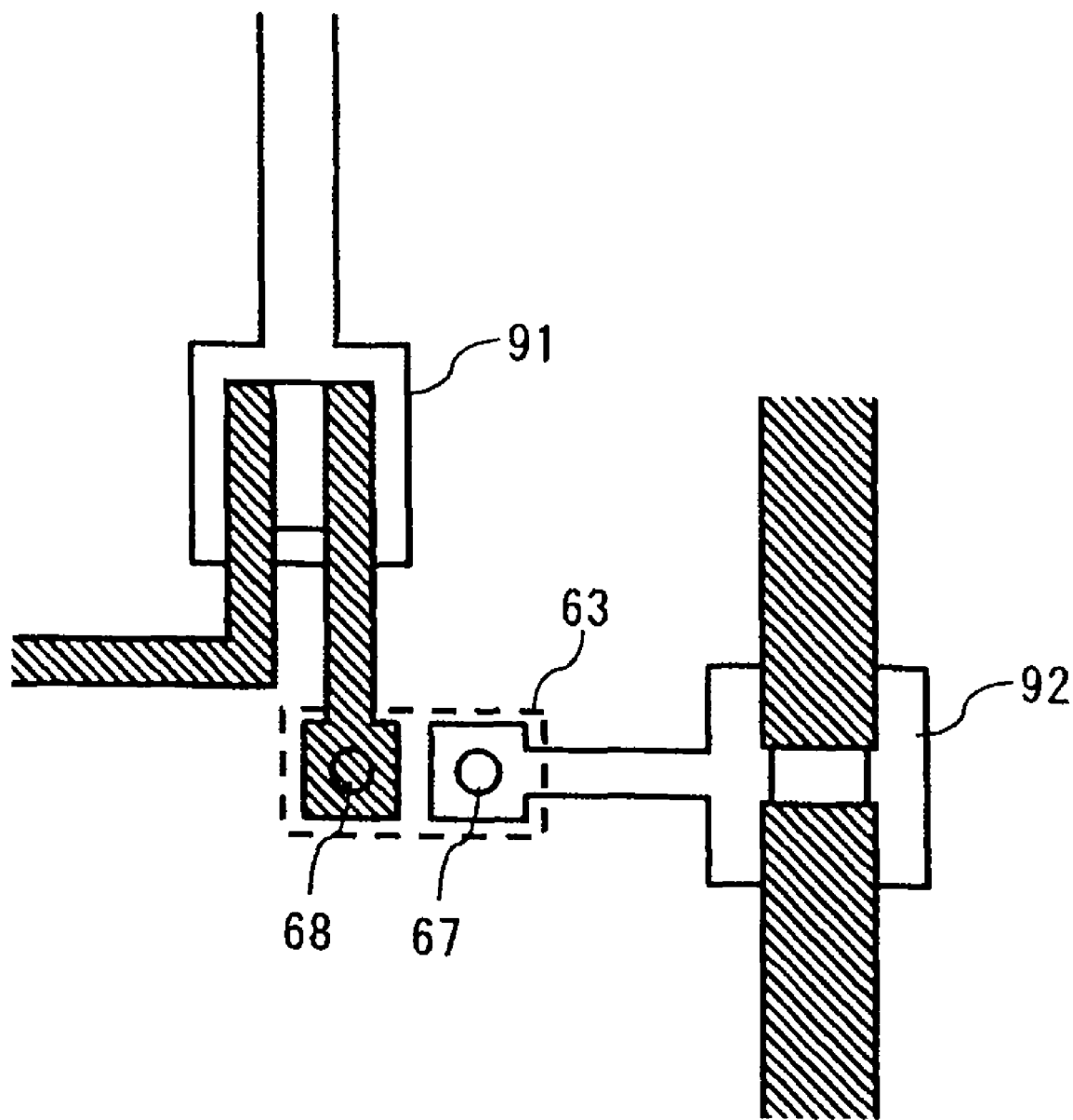
FIG. 6 is a plan view showing the configuration of a part of a drive circuit according to the embodiment of the present invention.

Further, in FIG. 1, the scan signal drive circuits 51 and the display signal drive circuits 52 serving as circuits for supplying signals to the wirings of display area 54 are formed outside the sealing material 50. In other words, outside the sealing material 50, the drive circuit is connected. The embodiment of the present invention is not limited thereto, and the drive circuit may be incorporated between the sealing material 50 and the common wiring contact portion 55. As a result, the frame size of the liquid crystal display panel can be reduced. In this case, the configuration of the drive circuit is described with reference to FIG. 6. FIG. 6 is a plan view showing the configuration of a part of the drive circuit.

The drive circuit is formed of a plurality of TFTs. In FIG. 6, the drive circuit includes a first drive circuit TFT 91 and a second drive circuit TFT 92. Accordingly, it is necessary to provide the layer conversion portion. In FIG. 6, the source/gate conversion portion 63 is formed. As in the case of the common wiring contact portion 55, the gate-side lighting test circuit portion 56, and the source-side lighting test circuit portion 57, the source/gate conversion portion 63 includes the ITO/gate contact portion 67 and the ITO/source contact portion 68. In the source/gate conversion portion 63, with the transparent conductive film being used as a bridge, the first metal thin film and the second metal thin film that are formed in different layers are electrically connected to each other. Thus, also the drive circuit has the layer conversion portion and a plurality of contact holes formed therein.

As examples of the contact holes formed outside the display area 54 and inside the sealing material 50, in particular, in the vicinity of the inside of the sealing material 50, the lighting test circuit and the drive circuit are illustrated, but the contact holes are not limited thereto. As long as the contact holes are formed in an area which has no alignment layer 32 formed therein and which is more likely to be affected by water or the like, any contact hole can be applied. Not only the contact holes formed in the above-mentioned area but also contact holes formed in other areas can be applied. Also in this case, the above-mentioned effects can be obtained.

Next, referring to FIGS. 7A to 7E, a description is given of a method of manufacturing a liquid crystal display panel. FIGS. 7A to 7E are cross-sectional views each showing a method of manufacturing the TFT array substrate 30 of the liquid crystal display panel.

First, the gate electrode 2, the gate signal line 3, the common wiring 4, and the first terminal 5 are formed. On the insulating substrate 1, first, the first metal thin film and the amorphous first transparent conductive film 6 are sequentially formed. As a result, a laminated structure of the first transparent conductive film 6 and the first metal thin film is obtained. After that, a first photolithography process is performed by coating a resist, which is a photosensitive resin, on the first transparent conductive film 6 by spin coating and exposing and developing the coated resist. Thus, the photoresist is patterned in a desired shape. Then, the first transparent conductive film 6 and the first metal thin film are etched by using the photoresist pattern as a mask, to thereby remove the photoresist pattern. Further, when it is necessary to remove the first transparent conductive film 6 formed on the gate electrode 2, the photolithography process may be carried out by using a gray-tone mask or a halftone mask. Specifically, the photoresist is applied onto the first transparent conductive film 6, and multi-gradation exposure and development are carried out by using the gray-tone mask or the halftone mask. As a result, above the areas which form the gate electrode 2, the gate signal line 3, the common wiring 4, and the first terminal 5, the resist pattern is formed. Note that the multi-gradation exposure is performed in this case, with the result that a film thickness of the resist pattern formed above the gate electrode 2 becomes smaller. In this manner, etching is performed by using the resist pattern having a two-stage film thickness as a mask, to thereby remove the first transparent conductive film 6 formed on the gate electrode 2. By the above-mentioned process, the gate electrode 2, the gate signal line 3, the common wiring 4, the first terminal 5, and the first transparent conductive film 6 are formed.

Figure 7A:
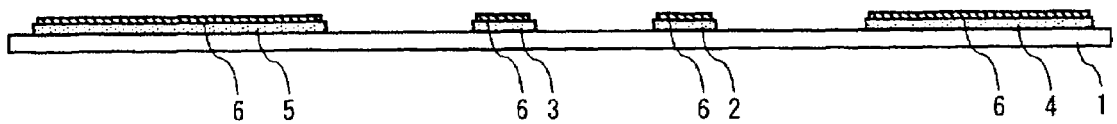
FIGS. 7A to 7E are cross-sectional views each showing a method of manufacturing the TFT array substrate of the liquid crystal display panel according to the embodiment of the present invention.

In the embodiment of the present invention, first, by a known sputtering method using an Ar gas, an Al-based alloy obtained by adding Ni to Al is formed as the first metal thin film with a thickness of 200 nm. As sputtering conditions, a DC magnetron sputtering system is employed at a deposition power density of 3 W/cm$^2$ and at an Ar gas flow rate of $6.76 \times 10^{-2}$ Pa·m$^3$/sec (=40 sccm). On the first metal thin film, an amorphous indium tin oxide (ITO) film having a thickness of 100 nm is formed as the transparent conductive film 6. As a preferred example, the ITO film is formed by the known sputtering method in which an H$_2$O gas is introduced into an Ar gas. As a target, there is used an ITO target having In$_2$O$_3$ (indium oxide) and SnO$_2$ (tin oxide) that are mixed at a ratio by weight of 9:1. In this case, an amorphous ITO film is formed at 120° C. or lower. After that, etching is performed using known solution containing phosphoric acid, nitric acid, and acetic acid. Thus, in the case of etching the amorphous first transparent conductive film 6, a mild acidic etchant can be used. As a result, the etchant identical with that used for the metal thin film can be used, and the first transparent conductive film 6 and the first metal thin film can be etched at the same time. In this case, the first transparent conductive film 6 and the first metal thin film are etched at the same time. After the etching, the resist pattern is removed. As a result, as shown in FIG. 7A, the gate electrode 2, the gate signal line 3, the common wiring 4, the first terminal 5, and the first transparent conductive film 6 are formed above the insulating substrate 1.

Next, by employment of various CVD methods such as plasma CVD, the gate insulating film 7, the semiconductor film 8, and the ohmic contact film 9 are sequentially formed. Then, through a second photolithography process, patterns of the semiconductor film 8 and the ohmic contact film 9 are formed. As the gate insulating film 7, $SiN_x$ (silicon nitride) or $SiO_y$ (silicon oxide) is used. As the semiconductor film 8, for example, a-Si (amorphous silicon) or p-Si (polysilicon) is used. As the ohmic contact film 9, there is used an n-type semiconductor such as $n^+$ a-Si ($n^+$ amorphous silicon) film, $n^+$ p-Si ($n^+$ polysilicon) film, or the like obtained by doping a small amount of phosphorus (P) or the like into an a-Si or a p-Si. It is preferable that the patterns of the semiconductor film 8 and the ohmic contact film 9 be formed not only in an area for forming the TFTs 90 serving as switching elements but also in an area in which the gate signal lines 3 and the source signal lines 11 intersect each other. As a result, a step formed at the pattern of the gate signal line 3 is smoothed by providing the patterns of the semiconductor film 8 and the ohmic contact film 9. Accordingly, the source signal line 11 is prevented from being disconnected in the step portion.

Figure 7B:
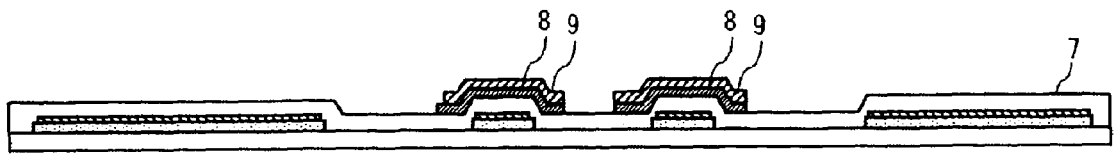

As a preferred example, by employment of chemical vapor deposition (CVD), an SiN film having a thickness of 400 nm is formed as the gate insulating film 7, an a-Si film having a thickness of 150 nm is formed as the semiconductor film 8, and an a-Si film having a thickness of 30 nm is formed as the ohmic contact film 9 in the stated order. The amorphous ITO film used as the first transparent conductive film 6 is heated at a temperature in a range from about 150° C. to 170° C. or higher and a crystallization reaction proceeds, whereby the ITO film is polycrystallized. Thus, the amorphous ITO film is polycrystallized when the gate insulating film 7 is formed. The polycrystallized ITO film is chemically stabilized as compared with the amorphous state. As a result, a corrosion resistance to liquid chemical is greatly enhanced. Further, after the formation of the pattern of the ITO film and before the formation of the interlayer insulating film 15, a heating process (annealing treatment) at 200° C. or higher, for example, may be additionally provided. Thus, before the formation of the gate insulating film 7, the ITO film is crystallized and chemically stabilized, whereby the quality of the ITO film is prevented from being changed. Then, phosphorus (P) is added as an impurity to the ohmic contact film 9, to thereby obtain an $n^+$ a-Si film. Next, by a known dry etching method using a fluorine series gas, the semiconductor film 8 and the ohmic contact film 9 are etched. After that, the resist pattern is removed, and as shown in FIG. 7B, patterns of the semiconductor film 8 and the ohmic contact film 9 are formed.

Then, by sputtering or the like, the second material thin film and the amorphous second transparent conductive film 14 that are source signal line materials are sequentially formed. As a result, a laminated configuration of the second transparent conductive film 14 and the second metal thin film is obtained. Then, a third photolithography process is carried out, and patterning is performed. Thus, the source electrode 10, the source signal line 11, the second terminal 12, the drain electrode 13, and the second transparent conductive film 14 are formed. Then, by using the patterns of the source electrode 10 and the drain electrode 13 as a mask, the ohmic contact film 9 is removed by etching or the like. By the process, a central portion of the ohmic contact film 9 is removed, and the semiconductor film 8 is exposed. A portion obtained after removing the ohmic contact film 9 corresponds to the channel region. After that, the photoresist pattern is removed and patterns of the source electrode 10, the source signal line 11, the second terminal 12, the drain electrode 13, the second transparent conductive film 14, and the channel region of the TFT 90 are formed.

In the embodiment of the present invention, as the second metal thin film, a MoNb alloy obtained by adding 2.5 mass % to 20 mass % of Nb to Mo is used. Then, by sputtering, the MoNb alloy is deposited with a thickness of 200 nm. After that, on the second metal thin film, an amorphous ITO film having a thickness of 100 nm is formed as the second transparent conductive film 14. As a preferred example, the ITO film is formed by the known sputtering method in which an $H_2O$ gas is introduced into an Ar gas. As a target, there is used an ITO target having $In_2O_3$ and $SnO_2$ that are mixed at a ratio by weight of 9:1. As sputtering conditions, the DC magnetron sputtering system is employed at an Ar gas flow rate of $1.69 \times 10^{-1}$ Pa·m$^3$/sec (=100 sccm), at an $H_2O$ gas flow rate of $5.07 \times 10^3$ Pa·m$^3$/sec (=3 sccm), and at a deposition power density of 1 W/cm$^2$. In this case, the amorphous ITO film is formed at 120° C. or lower. After that, the resist is patterned by the third photolithography process, and etching is performed using solution containing phosphoric acid, nitric acid, and acetic acid.

Figure 7C:
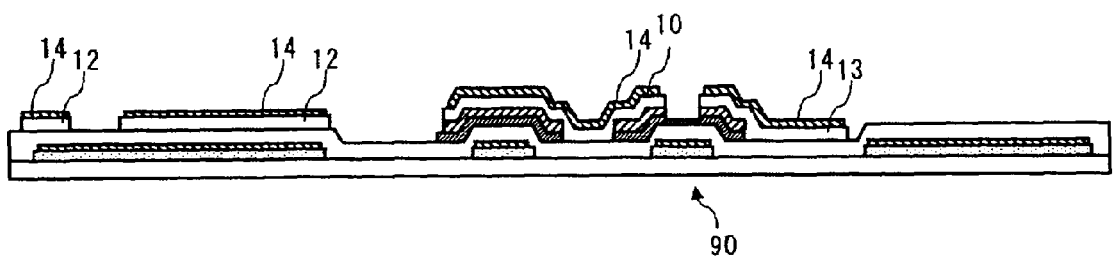

The etching rate of the amorphous ITO film using the solution containing phosphoric acid, nitric acid, and acetic acid is higher than that of the MoNb alloy. Accordingly, when the second metal thin film and the second transparent conductive film 14 are etched at the same time, the second transparent conductive film 14 formed in the upper layer is patterned into a smaller size. As a result, in the subsequent process, the coverage characteristic of the interlayer insulating film 15 formed on the second transparent conductive film 14 can be improved. By the above-mentioned process, the configuration shown in FIG. 7C is obtained.

After that, by employment of various CVD methods such as plasma CVD, the interlayer insulating film 15 formed of an insulating film made of $SiN_x$, $SiO_y$, or a mixture and laminate thereof. Then, a fourth photolithography process is carried out, and patterning is performed.

By the process, a part of the interlayer insulating film 15 formed above the drain electrode 13 is removed, and the second transparent conductive film 14 formed on the drain electrode 13 is exposed. As a result, the pixel contact hole 16 is formed. Further, by the same process, a part of each of the interlayer insulating film 15 and the gate insulating film 7 that are formed above the first terminal 5 is removed, whereby the first transparent conductive film 6 formed on the first terminal 5 is exposed. As a result, the first terminal portion contact hole 17 is formed. In addition, by the same process, a part of the interlayer insulating film 15 formed above the second terminal 12 is removed, and the second transparent conductive film 14 formed on the second terminal 12 is exposed. As a result, the second terminal portion contact hole 18 is formed. Then, the transparent conductive film which is formed later and which becomes the pixel electrode 19 and the like is made conductive with the drain electrode 13 of the TFT, the first terminal 5, and the second terminal 12.

Figure 7D:
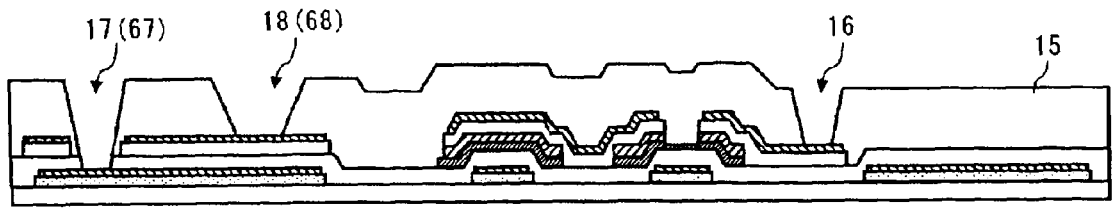

As a preferred example, the interlayer insulating film 15 is formed by chemical vapor deposition (CVD). During the deposition by CVD, a substrate heating temperature is set to 230° C. Specifically, in a state where the substrate having the second transparent conductive film 14 formed above the substrate is heated to 230° C., the interlayer insulating film 15 is formed. The amorphous ITO film used as the second transparent conductive film 14 is heated at the temperature in the range from about 150° C. to 170° C. or higher, and the crystallization reaction proceeds, whereby the ITO film is polycrystallized. Thus, the amorphous ITO film is polycrystallized when the interlayer insulating film 15 is formed. The polycrystallized ITO film is chemically stabilized as compared with the amorphous state. As a result, the corrosion resistance to liquid chemical is greatly enhanced. Further, in the same manner as described above, after the formation of the pattern of the ITO film and before the formation of the interlayer insulating film 15, the heating process (annealing treatment) at 200° C. or higher, for example, may be additionally provided. After that, contact holes are formed, whereby the configuration shown in FIG. 7D is obtained.

After that, the transparent conductive film made of ITO, $SnO_2$, InZnO, or the like is formed by using a technique such as sputtering, deposition, application, CVD, a printing method, and a sol-gel method. Then, a fifth photolithography process is carried out, and patterning is performed. By the process, patterns of the pixel electrode 19 and the terminal pad 20 are formed. The pixel electrode 19 is formed in the pixel contact hole 16 and comes into contact with the second transparent conductive film 14 formed on the drain electrode 13. As a result, through the pixel contact hole 16, the pixel electrode 19 and the drain electrode 13 are electrically connected to each other. The terminal pad 20 is formed over the first terminal portion contact hole 17 and the second terminal portion contact hole 18. Then, the terminal pad 20 comes into contact with the first transparent conductive film 6 formed on the first terminal 5 and also comes into contact with the second transparent conductive film 14 formed on the second terminal 12. As a result, the terminal pad 20, the first terminal 5, and the second terminal 12 are electrically connected to each other through the first terminal portion contact hole 17 and the second terminal portion contact hole 18.

In the embodiment of the present invention, as the transparent conductive film forming the pixel electrode 19 and the terminal pad 20, ITO is used. As a preferred example, an amorphous ITO film having a thickness of 100 nm is formed by a known sputtering method in which $H_2O$ gas is introduced in Ar gas. As a target, there is used an ITO target having $In_2O_3$ and $SnO_2$ that are mixed at a ratio by weight of 9:1. In this case, the amorphous ITO film is formed at 120° C. or lower. As sputtering conditions, the DC magnetron sputtering system is employed at an Ar gas flow rate of $1.69\times10^{-1}$ Pa·m$^3$/sec (=100 sccm), at an $H_2O$ gas flow rate of $5.07\times10^{-3}$ Pa·m$^3$/sec (=3 sccm), and at a deposition power density of 1 W/cm$^2$. After that, the resist is patterned by the fifth photolithography process, and etching is performed using known solution mainly made of oxalic acid.

Figure 7E:
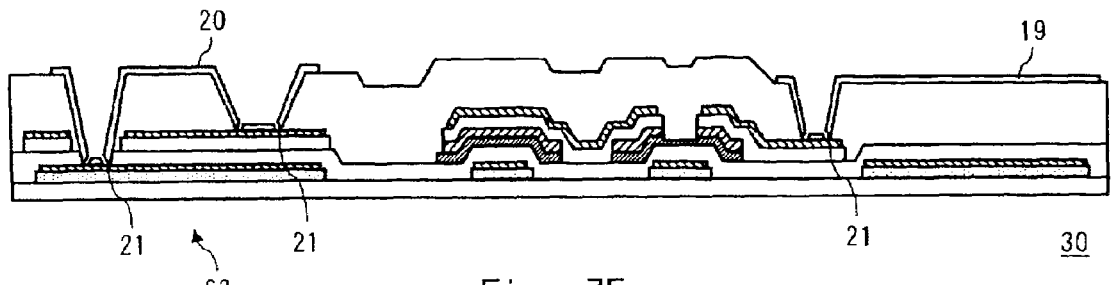

After the resist pattern is removed, heat treatment for the substrate is performed. In the embodiment of the present invention, the heat treatment is carried out at a temperature of about 220° C., whereby the amorphous ITO film is polycrystallized. The amorphous ITO film is heated at a temperature in a range from about 150° C. to 170° C. or higher, and the crystallization reaction proceeds, whereby the ITO film is polycrystallized. The polycrystallized ITO film is chemically stabilized as compared with the amorphous state. Accordingly, the corrosion resistance to liquid chemical is greatly enhanced. However, when the amorphous ITO film is polycrystallized, volume contraction of the ITO film occurs. As a result, in the step portions of the contact holes 16, 17, and 18, the coverage defect of the ITO film occurs. In addition, a disconnection, that is, a so-called step disconnection of the ITO film occurs in some parts. In view of this, in the embodiment of the present invention, the transparent conductive film formed in the contact holes 16, 17, and 18 has a two-layer structure. Owing to the two-layer structure, water, impurities, and the like entering from the outside are prevented from being brought into direct contact with the metal thin film, which forms the wirings, electrodes, and terminals, through the coverage defect portions 21. As a result, the corrosion or the electrical corrosion of the wirings, electrodes, and terminals can be suppressed. By the above-mentioned process, the configuration shown in FIG. 7E is obtained, whereby the TFT array substrate 30 is manufactured.

Next, by employment of the known technique, the alignment layer 32 is formed on an electrode forming surface of the TFT array substrate 30. The counter substrate 31 has the color filter layer, the counter electrode, the alignment layer 32 that are sequentially formed on the insulating substrate. The alignment layers 32 are formed in the display area 54 having a plurality of pixels 58. The color filter layer for displaying each color includes a black matrix (BM) layer serving as a light-shielding layer, and red (R), green (G), and blue (B) pigmented layers. With the surfaces on which the alignment layers 32 are formed being on the inside, the TFT array substrate 30 and the counter substrate 31 are bonded together using the sealing material 50. After that, a liquid crystal is injected to be sealed between both the TFT array substrate 30 and the counter substrate 31, whereby the liquid crystal display panel is manufactured.

As described above, by forming the wirings, electrodes, or terminals into the two-layer structure having the metal thin film and the transparent conductive film, the excellent drive performance and display characteristics can be obtained. Note that, as compared with the metal thin film, the transparent conductive film is hardly affected by water or the like. Accordingly, it is preferable to employ the two-layer structure having the metal thin film and the transparent conductive film instead of employing a two-layer structure of metal thin films.

In the embodiment of the present invention, as the first metal thin film, the Al-based alloy obtained by adding Ni to Al is used, but the first metal thin film is not limited thereto. For example, it is possible to use the laminated layer film in which a MoNb film used as the second metal thin film was formed in the upper layer of an AlNd film of a two-layer film having an AlNd film and an AlNd—N film in the upper layer of the AlNd film. Further, as the first metal thin film, a MoNb single-layer film may be used. In addition, as the second metal thin film, in addition to the MoNb single-layer film according to the embodiment of the present invention, a laminated layer film having a MoNb film and an AlNd film can be used. In this case, as compared with the MoNb single-layer film, the wiring resistance of the source signal line 11 can be reduced. Further, the Al-based or Mo-based alloy film is not limited to AlNd and MoNb. For example, an alloy system such as AlCu, AlSi, AlTa, AlY, or AlNi, an alloy system such as MoW, MoCr, or MoV, or a combination thereof can be used. In addition, a conventional metal film such as Cr, Ta, W, or Ti, which is excellent in the corrosion resistance to strong acid solution, an alloy film mainly formed of such a metal film, and the like, can also be used.

In the embodiment of the present invention, it is preferable to use an ITO film as the amorphous transparent conductive film formed on the first metal thin film or on the second metal thin film, because the ITO film can be polycrystallized by heat treatment performed after the ITO film is patterned. In addition, an IZO film obtained by adding ZnO (zinc oxide) to $In_2O_3$ (indium oxide), or an ITZO film obtained by further adding ZnO to the ITO film may be used. In this case, without the need of mixing an $H_2O$ gas or an $H_2$ gas, the amorphous transparent conductive film can be obtained by employment of a conventionally known sputtering method using only an Ar gas.

In the above embodiments, examples applied to the transmissive liquid crystal display panel are illustrated, but the present invention is not limited thereto. The present invention can also be applied to transflective and reflective liquid crystal display panels. In addition, the present invention can be applied to, for example, other display panels or devices using a transparent conductive film such as an organic EL display panel and an inorganic EL display panel. Also in this case, by forming a transparent conductive film having a two-layer structure above a substrate having contact holes, through holes, or step shape portions, the same effects as those of the embodiments of the present invention can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A display panel including a first substrate and a second substrate that are bonded together through a sealing material, the display panel comprising:
   a first metal thin film formed above the first substrate and having a terminal;
   a protective transparent conductive film formed above the first metal thin film;
   an insulating film formed above the protective transparent conductive film and having a contact hole formed outside a display area and inside the sealing material; and
   a transparent conductive film formed above the insulating film and electrically connected to the first metal thin film through the protective transparent conductive film in the contact hole.

2. The display panel according to claim 1, further comprising:
   a second metal thin film formed above the first metal thin film and formed below the transparent conductive film; and
   a layer conversion portion having the contact hole formed therein,
   wherein at the layer conversion portion the first metal thin film and the second metal thin film, which are formed in different layers, are electrically connected to each other through the transparent conductive film.

3. The display panel according to claim 2, further comprising a circuit formed outside the display area to supply a signal to wiring of the display area,
   wherein the layer conversion portion is formed in the circuit.

4. The display panel according to claim 1, wherein the protective transparent conductive film comprises one of an ITO film containing an indium oxide and a tin oxide, and an IZO film containing an indium oxide and a zinc oxide.

5. The display panel according to claim 2, wherein the protective transparent conductive film comprises one of an ITO film containing an indium oxide and a tin oxide, and an IZO film containing an indium oxide and a zinc oxide.

6. The display panel according to claim 3, wherein the protective transparent conductive film comprises one of an ITO film containing an indium oxide and a tin oxide, and an IZO film containing an indium oxide and a zinc oxide.

7. A method of manufacturing a display panel, the display panel including a first substrate and a second substrate that are bonded together through a sealing material, the method comprising the steps of:
   forming, above the first substrate, a metal thin film having a terminal;
   forming a protective transparent conductive film above the metal thin film;
   forming, above the protective transparent conductive film, an insulating film having a contact hole formed outside a display area and inside the sealing material; and
   forming, above the insulating film, a transparent conductive film electrically connected to the metal thin film through the protective transparent conductive film in the contact hole.

8. The method of manufacturing a display panel according to claim 7, wherein:
   the step of forming the protective transparent conductive film comprises forming the protective transparent conductive film in an amorphous state; and
   the step of forming the insulating film comprises crystallizing the protective transparent conductive film at a substrate heating temperature obtained when the insulating film is formed.

9. The method of manufacturing a display panel according to claim 7, wherein the protective transparent conductive film comprises one of an ITO film containing an indium oxide and a tin oxide, and an IZO film containing an indium oxide and a zinc oxide.

10. The method of manufacturing a display panel according to claim 8, wherein the protective transparent conductive film comprises one of an ITO film containing an indium oxide and a tin oxide, and an IZO film containing an indium oxide and a zinc oxide.

11. The method of manufacturing a display panel according to claim 7, wherein the step of forming the protective transparent conductive film comprises wet etching the protective transparent conductive film and the metal thin film at the same time by use of a mild acidic etchant.

12. The method of manufacturing a display panel according to claim 8, wherein the step of forming the protective transparent conductive film comprises wet etching the protective transparent conductive film and the metal thin film at the same time by use of a mild acidic etchant.

13. The method of manufacturing a display panel according to claim 9, wherein the step of forming the protective transparent conductive film comprises wet etching the protective transparent conductive film and the metal thin film at the same time by use of a mild acidic etchant.

14. The method of manufacturing a display panel according to claim 7, wherein the step of forming the transparent conductive film comprises wet etching the transparent conductive film by use of an etchant mainly made of oxalic acid.

15. The method of manufacturing a display panel according to claim 8, wherein the step of forming the transparent conductive film comprises wet etching the transparent conductive film by use of an etchant mainly made of oxalic acid.

16. The method of manufacturing a display panel according to claim 9, wherein the step of forming the transparent conductive film comprises wet etching the transparent conductive film by use of an etchant mainly made of oxalic acid.

* * * * *